(12) United States Patent
Choi et al.

(10) Patent No.: US 12,322,817 B2
(45) Date of Patent: Jun. 3, 2025

(54) BATTERY PACK, AND ELECTRONIC DEVICE AND VEHICLE INCLUDING THE SAME

(71) Applicant: LG ENERGY SOLUTION, LTD., Seoul (KR)

(72) Inventors: Bum Choi, Daejeon (KR); Jong-Yoon Keum, Daejeon (KR); Dong-Hwan Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 451 days.

(21) Appl. No.: 17/776,188

(22) PCT Filed: Jun. 11, 2021

(86) PCT No.: PCT/KR2021/007361
§ 371 (c)(1),
(2) Date: May 11, 2022

(87) PCT Pub. No.: WO2021/256788
PCT Pub. Date: Dec. 23, 2021

(65) Prior Publication Data
US 2022/0407160 A1 Dec. 22, 2022

(30) Foreign Application Priority Data
Jun. 16, 2020 (KR) .................. 10-2020-0073140

(51) Int. Cl.
*H01M 50/213* (2021.01)
*H01M 50/242* (2021.01)
(Continued)

(52) U.S. Cl.
CPC ....... *H01M 50/213* (2021.01); *H01M 50/242* (2021.01); *H01M 50/262* (2021.01); *H01M 50/507* (2021.01); *H01M 2220/20* (2013.01)

(58) Field of Classification Search
None
See application file for complete search history.

(56) References Cited

U.S. PATENT DOCUMENTS

| 9,577,227 | B2 | 2/2017 | Sumpf et al. |
| 11,462,799 | B2 | 10/2022 | Ahn et al. |

(Continued)

FOREIGN PATENT DOCUMENTS

| CN | 104993187 A | 10/2015 |
| CN | 105229820 A | 1/2016 |

(Continued)

OTHER PUBLICATIONS

International Search Report (with partial translation) and Written Opinion dated Sep. 29, 2021, for corresponding International Patent Application No. PCT/KR2021/007361.

(Continued)

*Primary Examiner* — Carlos Barcena
(74) *Attorney, Agent, or Firm* — Morgan, Lewis & Bockius LLP

(57) ABSTRACT

A battery pack includes a plurality of battery cells elongated to be oriented in a vertical direction and having a pair of electrode terminals located at an upper portion thereof, the plurality of battery cells being arranged in at least one horizontal direction; and a pack housing having an accommodation space in which the plurality of battery cells are accommodated and configured such that a lower portion of each of the plurality of battery cells is bonded to an inner surface of the pack housing.

9 Claims, 8 Drawing Sheets

(51) Int. Cl.
    *H01M 50/262*     (2021.01)
    *H01M 50/507*     (2021.01)

(56) References Cited

U.S. PATENT DOCUMENTS

| | | | |
|---|---|---|---|
| 2011/0214808 A1* | 9/2011 | Hermann | H01M 50/26 |
| | | | 156/380.9 |
| 2012/0003508 A1 | 1/2012 | Narbonne et al. | |
| 2012/0015227 A1 | 1/2012 | Hwang et al. | |
| 2014/0255748 A1 | 9/2014 | Jan et al. | |
| 2015/0086830 A1 | 3/2015 | Sun et al. | |
| 2015/0188203 A1* | 7/2015 | Enomoto | H01M 50/24 |
| | | | 429/83 |
| 2018/0069212 A1 | 3/2018 | Mastrandrea et al. | |
| 2018/0175343 A1 | 6/2018 | Choi et al. | |
| 2018/0212222 A1 | 7/2018 | Barton et al. | |
| 2018/0261823 A1 | 9/2018 | Jan et al. | |
| 2018/0287112 A1 | 10/2018 | Juventin et al. | |
| 2019/0165437 A1 | 5/2019 | Kellner et al. | |
| 2019/0229309 A1* | 7/2019 | Newman | H01M 50/271 |
| 2019/0267682 A1 | 8/2019 | Seo et al. | |
| 2019/0334140 A1 | 10/2019 | Linde | |
| 2020/0083575 A1 | 3/2020 | Yoo et al. | |
| 2020/0185798 A1* | 6/2020 | Ing | H01M 50/204 |
| 2020/0194853 A1 | 6/2020 | Yoo et al. | |
| 2020/0212391 A1* | 7/2020 | Chen | H01M 50/121 |
| 2020/0227698 A1 | 7/2020 | Muratsu et al. | |
| 2020/0227699 A1 | 7/2020 | Muratsu et al. | |
| 2020/0381683 A1 | 12/2020 | Shimizu et al. | |
| 2021/0028414 A1 | 1/2021 | Cho et al. | |

FOREIGN PATENT DOCUMENTS

| | | |
|---|---|---|
| CN | 105659430 A | 6/2016 |
| CN | 107425165 A | 12/2017 |
| CN | 109841773 A | 6/2019 |
| CN | 110574221 A | 12/2019 |
| CN | 110692162 A | 1/2020 |
| CN | 110854334 A | 2/2020 |
| JP | 2016-516273 A | 6/2016 |
| JP | 2019-145459 A | 8/2019 |
| JP | 2020-514991 A | 5/2020 |
| KR | 10-1156539 B1 | 6/2012 |
| KR | 10-2017-0135597 A | 12/2017 |
| KR | 10-2018-0112617 A | 10/2018 |
| KR | 10-2018-0129115 A | 12/2018 |
| KR | 10-2019-0011096 A | 2/2019 |
| KR | 10-2019-0047499 A | 5/2019 |
| KR | 10-2019-0047513 A | 5/2019 |
| KR | 10-2019-0053124 A | 5/2019 |
| KR | 10-2019-0097231 A | 8/2019 |
| KR | 10-2019-0106541 A | 9/2019 |
| KR | 10-2070573 B1 | 1/2020 |
| TW | 201933648 A | 8/2019 |
| WO | 2019/044582 A1 | 3/2019 |
| WO | 2019/044724 A1 | 3/2019 |

OTHER PUBLICATIONS

Office Action issued Sep. 15, 2023 for counterpart Chinese Patent Application No. 202180007271.8.
Office Action dated Jan. 15, 2024 issued in corresponding Japanese Patent Application No. 2022-528281. (Note: KR 10-2019-0047513 A, KR 10-2019-0047499 A, Jp 2019-145459 A, Jp 2020-514991 A, were previously cited).
Japanese Office Action issued in corresponding JP Application No. 273407 dated Jun. 5, 2023. Note: KR10-2019-0047513, KR10-2019-0047499 cited therein are already of record.
Partial supplementary European search report issued in corresponding EP Patent Application No. 21825233.6, dated Jun. 16, 2023.
Henkel AG & Co. KGaA, "Adhesive solutions for efficient Li-ion cell assembly", Mar. 2, 2020, XP093055065, Retrieved from the Internet: URL:https://www.henkel.com/resource/blob/1 O4OO96lb7386cb652Ofddfaff4f5c3c729a884/da ta/2O2O-O3-O2-press-release-adhesive-solutions-for-efficient-li-ion-cell-assembly. pdf—retrieved on Jun. 16, 2023, pp. 1-4.
Extended European Search Report issued Oct. 31, 2023 for European Patent Application No. 21825233.6 Note: JP 2020-514991 A, Kr 10-2019-0097231 A & "Adhesive solutions for efficient Li-ion cell assembly" cited therein are already of record.
Office Action issued in corresponding CN Application No. 202180007271.8, dated Jul. 29, 2024. (Note: US 2012/0003508 A1, CN 110854334 A and CN 110692162 A were previously cited).
Office Action dated Feb. 11, 2025 issued in corresponding Taiwanese Patent Application No. 110121714.

\* cited by examiner

BATTERY PACK, AND ELECTRONIC DEVICE AND VEHICLE INCLUDING THE SAME

TECHNICAL FIELD

The present disclosure relates to a battery pack, and an electronic device and a vehicle including the battery pack, and more particularly, to a battery pack in which the number of components is reduced and the energy density and manufacturing efficiency are improved.

The present application claims priority to Korean Patent Application No. 10-2020-0073140 filed on Jun. 16, 2020 in the Republic of Korea, the disclosures of which are incorporated herein by reference.

BACKGROUND ART

Recently, as the demand for portable electronic products such as laptops, video cameras and portable telephones is rapidly increasing along with full-scale developments of electric vehicles, energy storage batteries, robots, satellites, and the like, a high-performance secondary battery capable of repetitive charging and discharging is being actively studied.

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. In addition, the lithium secondary battery includes an electrode assembly in which a positive electrode plate coated with the positive electrode active material and a negative electrode plate coated with the negative electrode active material are disposed with a separator being interposed therebetween, and an exterior, namely a battery case, for hermetically containing the electrode assembly together with an electrolyte.

In addition, the lithium secondary battery may be classified depending on the shape of the exterior into a can-type secondary battery in which an electrode assembly is embedded in a metal can and a pouch-type secondary battery in which the electrode assembly is embedded in a pouch made of an aluminum laminate sheet.

Among them, in the can-type secondary battery, the metal can in which the electrode assembly is embedded may be manufactured in a cylindrical shape. The conventional battery module may include a module case for accommodating a plurality of secondary batteries and a bus bar configured to electrically connect the plurality of can-type secondary batteries.

In addition, in the prior art, in order to manufacture a battery pack, the plurality of secondary batteries may be primarily included in the module case. In addition, the module case accommodating the plurality of secondary batteries is mounted to a pack housing again, and then the pack housing and the module case are coupled, thereby manufacturing a battery pack.

However, if the battery pack includes both the module case and the pack housing, this structure decreases the energy density of the pack, makes the manufacturing process be complicated, and increases the manufacturing cost.

DISCLOSURE

Technical Problem

The present disclosure is designed to solve the problems of the related art, and therefore the present disclosure is directed to providing a battery pack in which the number of components is reduced and the energy density and manufacturing efficiency are improved.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising:
a plurality of battery cells elongated to be erect in an upper and lower direction and having a pair of electrode terminals located at an upper portion thereof, the plurality of battery cells being arranged in at least one direction; and
a pack housing having an accommodation space for accommodating the plurality of battery cells and configured such that a lower portion of each of the plurality of battery cells is bonded to an inner surface thereof.

Also, the pack housing may include a plurality of fixing protrusions configured to accommodate an adhesive, so that the lower portion of each of the plurality of battery cells is inserted therein.

Moreover, a filler may be added inside the pack housing to surround a side portion of each of the plurality of battery cells.

In addition, the pack housing may include a lower frame configured to accommodate the plurality of battery cells therein and an upper frame coupled to the lower frame and located at an upper portion of the plurality of battery cells.

Also, the battery pack may further comprise a plurality of bus bars mounted on the upper frame and configured to contact the electrode terminals of each of the plurality of battery cells, and the bus bar may include a plurality of conductive wires.

Moreover, the upper frame may include a protruding portion protruding toward the electrode terminal of each of the plurality of battery cells to cover the electrode terminal.

In addition, the battery pack may further comprise a reinforcing member fixed to at least one of an inner lower surface, an inner upper surface and an inner side surface of the pack housing.

Further, the reinforcing member may include:
a body portion configured to extend toward the inner side surface; and
a bent portion provided to each of both ends of the body portion and configured to be bent to face the inner side surface of the pack housing and to be bonded to the inner side surface of the pack housing.

Also, the reinforcing member may include:
an accommodation groove formed by indenting a part of the body portion inward so that the filler is filled therein; and a coupling hole formed by perforating a part of the bent portion so that the filler is accommodated therein.

Moreover, the reinforcing member may include a pair of plates respectively configured to extend in one direction and spaced apart from each other by a predetermined distance to form a space therebetween, each of the pair of plates may have an opening formed so that the inner space between the pair of plates communicates with the outside, and the inner space between the pair of plates may be filled with the filler.

In addition, in another aspect of the present disclosure, there is also provided an electronic device, comprising at least one battery pack.

Also, in another aspect of the present disclosure, there is also provided a vehicle, comprising at least one battery pack.

Advantageous Effects

According to an embodiment of the present disclosure, since the present disclosure includes the pack housing configured to accommodate the plurality of battery cells so that the lower portion of each of the plurality of battery cells is bonded to the inner surface thereof, the lower portion of the plurality of battery cells may be directly fixed to the pack housing without using a separate module case, thereby simplifying the manufacturing process and reducing the number of parts, resulting in increasing energy density and reducing manufacturing cost.

Moreover, according to an embodiment of the present disclosure, since the filler is added into the pack housing to surround the side portion of each of the plurality of battery cells, it is possible to prevent an electrical short circuit between the plurality of battery cells. Moreover, if a rupture or flame occurs at the side portion of the battery can since any one of the plurality of battery cells is ignited in use of the battery pack due to an external shock or abnormal operation, it is possible to prevent flame or high-temperature gas from being transmitted to the plurality of battery cells adjacent to the ignited battery cell to cause thermal runaway or chain ignition. That is, the filler may play a role of blocking heat transfer between the plurality of battery cells.

In addition, according to an embodiment of the present disclosure, since the present disclosure further includes the reinforcing member fixed to at least one of the inner lower surface, the inner upper surface and the inner side surface of the pack housing, it is possible to effectively prevent the pack housing from being deformed due to vibration or external shock. That is, the reinforcing member may prevent the pack housing from being deformed by the weight of the plurality of battery cells. In particular, the reinforcing member may effectively prevent the pack housing from being bent in an upper and lower direction.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
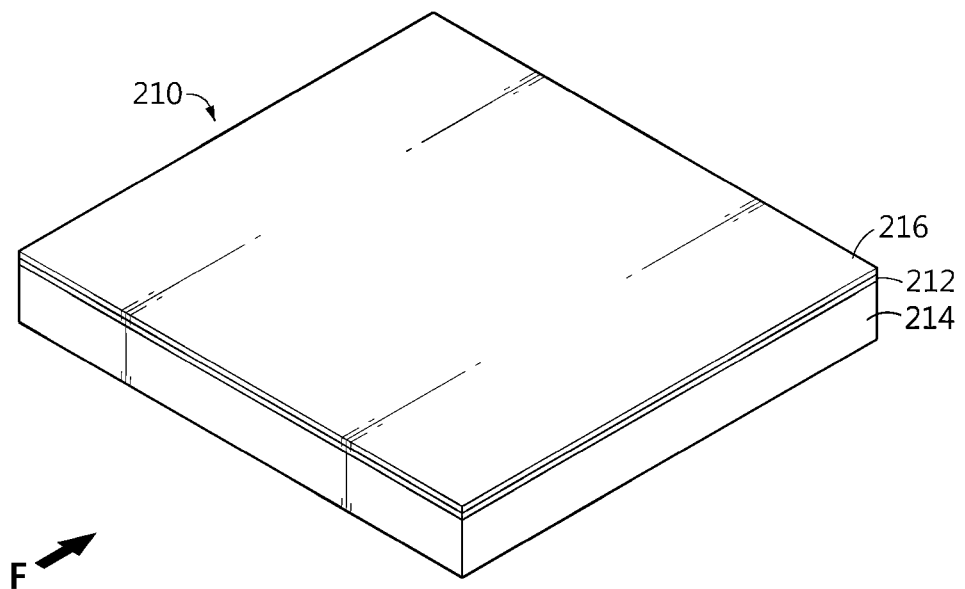
FIG. 1 is a perspective view schematically showing a battery pack according to an embodiment of the present disclosure.
Figure 2:
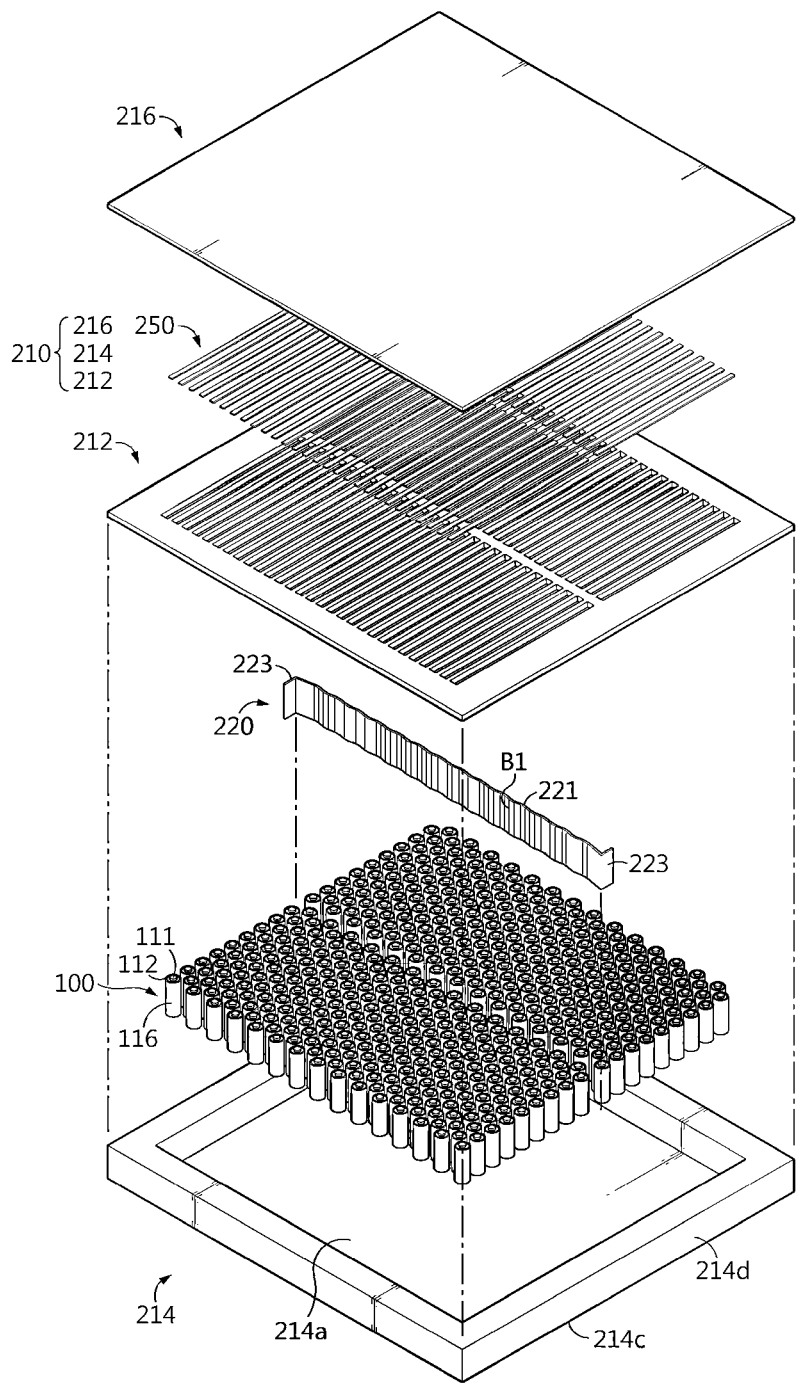
FIG. 2 is an exploded perspective view schematically showing components of the battery pack according to an embodiment of the present disclosure.

FIG. 1 is a perspective view schematically showing a battery pack according to an embodiment of the present disclosure. Also, FIG. 2 is an exploded perspective view schematically showing components of the battery pack according to an embodiment of the present disclosure. For reference, the X-axis direction is a right direction, the Y-axis direction is a rear direction, and the Z-axis direction is an upper direction in FIG. 1.

Referring to FIGS. 1 and 2, a battery pack 200 of the present disclosure may include a plurality of battery cells 100 and a pack housing 210.

Here, the battery cell 100 may have a shape elongated to be erect in an upper and lower direction. An electrode terminal may be provided to an upper portion of the battery cell 100.

Specifically, the battery cell 100 may be a cylindrical battery cell. The battery cell 100 may include a battery can 116, and an electrode assembly (not shown) accommodated in the battery can 116. A negative electrode terminal 112 may be formed at the body of the battery can 116, and a positive electrode terminal 111 may be formed at a battery cap coupled to an upper portion of the battery can 116.

Further, the plurality of battery cells 100 may be arranged in at least one direction. The plurality of battery cells 100 may be arranged to be spaced apart from each other at predetermined intervals. For example, when viewed in the F direction of FIG. 1, the plurality of battery cells 100 may be arranged in a front and rear direction and in a left and right direction.

Meanwhile, the terms "upper", "lower", "front", "rear", "left" and "right" used in this specification to represent directions may be changed depending on a location of an observer or a placed form of an object. However, in this specification, for convenience of explanation, the "upper", "lower", "front", "rear", "left" and "right" directions will be distinguishably used based on when viewed in the F direction.

Moreover, the plurality of battery cells 100 may be disposed to be spaced apart by a distance of about 3 mm, for example. In addition, the plurality of battery cells 100 positioned in one column and the plurality of battery cells 100 positioned in another column may be disposed at different locations in a front and rear direction. In addition, the plurality of battery cells 100 positioned in one row and the plurality of battery cells 100 positioned in another row may be disposed at different locations in a left and right direction. That is, the plurality of battery cells 100 may be regarded as being disposed in a zigzag arrangement in the front, rear, left and right directions as a whole.

In addition, the pack housing 210 may have an accommodation space for accommodating the plurality of battery cells 100. Referring to FIG. 2, the pack housing 210 may have an inner space capable of accommodating the plurality of battery cells 100 therein.

Specifically, the pack housing 210 may include an inner upper wall, an inner side wall, and an inner lower wall. The lower portion of each of the plurality of battery cells 100 may be bonded to an upper surface of the lower wall. At this time, the lower portion of the battery cell 100 may be bonded to an inner bottom surface 214a of the pack housing 210 using an adhesive 230.

Specifically, the adhesive 230 may be an adhesive 230 that is solidified after being injected into the pack housing 210. The adhesive 230 may have electrical insulation. The adhesive 230 may be a glue or a hot-melt resin. For example, the adhesive 230 may include at least one of a polyamide-based resin, a polyimide-based resin, an epoxy-based resin, and an acryl-based resin.

Accordingly, according to this configuration of the present disclosure, since the present disclosure includes the pack housing 210 configured to accommodate the plurality of battery cells 100 so that the lower portion of each of the plurality of battery cells 100 is bonded to the inner surface thereof, the lower portion of the plurality of battery cells 100 may be directly fixed to the pack housing 210 without using a separate module case, thereby simplifying the manufacturing process and reducing the number of parts, resulting in increasing energy density and reducing manufacturing cost.

Figure 3:
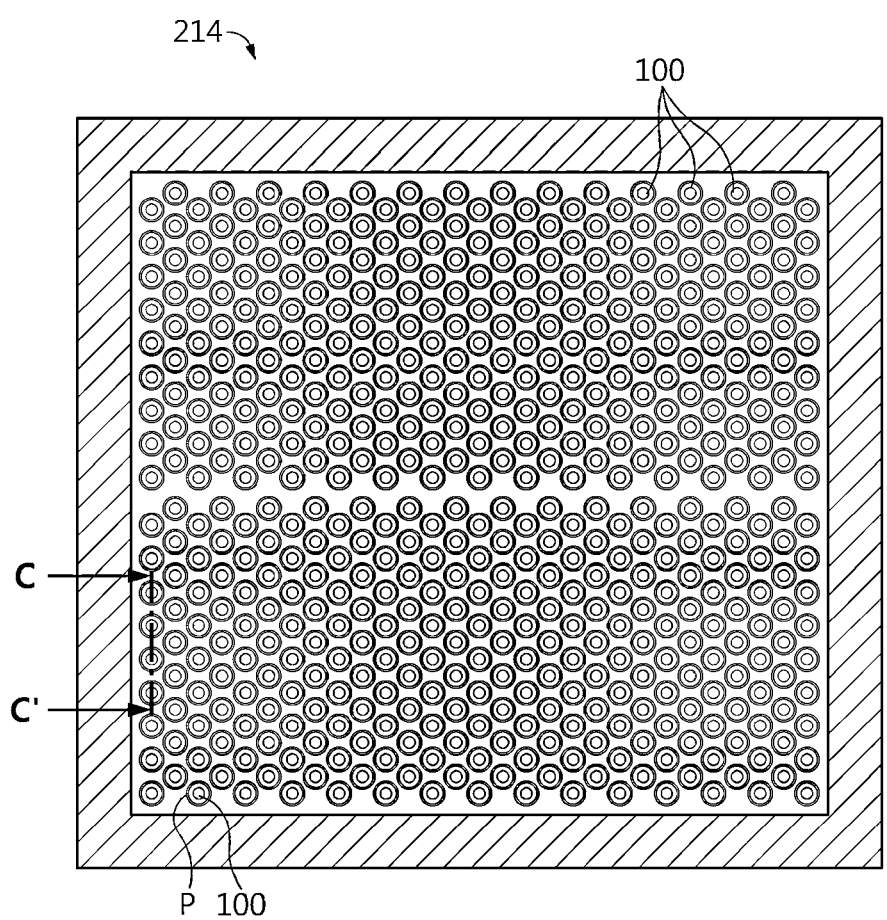
FIG. 3 is a partial plan view schematically showing some components of a battery pack according to another embodiment of the present disclosure.

FIG. 3 is a partial plan view schematically showing some components of a battery pack according to another embodiment of the present disclosure. Also, FIG. 4 is a vertical sectional view schematically showing the battery pack, taken along the line C-C' of FIG. 3.

Figure 4:
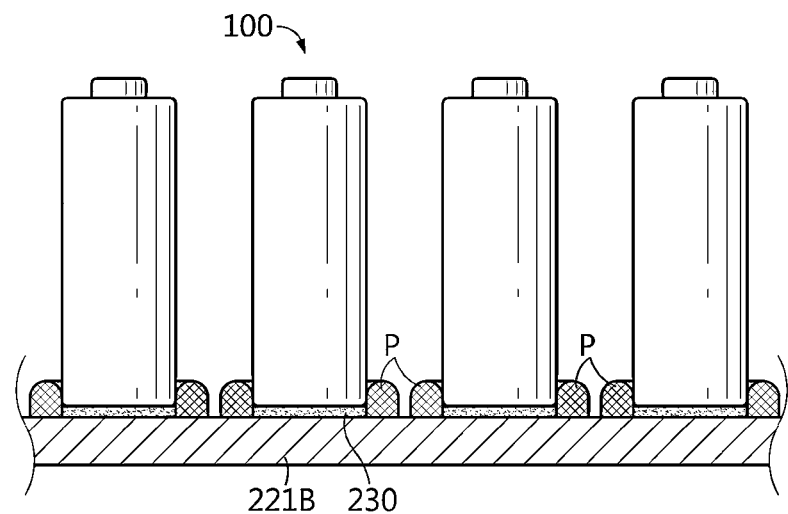
FIG. 4 is a vertical sectional view schematically showing the battery pack, taken along the line C-C' of FIG. 3.

Referring to FIGS. 3 and 4 along with FIG. 2, a plurality of fixing protrusions P configured so that a lower portion of the plurality of battery cells 100 is inserted therein may be provided to the inner bottom surface of the pack housing 210. The fixing protrusion P may have a shape protruding toward the battery cell 100 (upward) from the inner surface of the pack housing 210 to guide the mounting position of the plurality of battery cells 100.

That is, the fixing protrusion P may have a circular shape on a plane so as to surround an outer peripheral portion of a lower end of the battery cell 100. In addition, one battery cell 100 may be mounted inside the circular fixing protrusion P.

In addition, the adhesive 230 may be accommodated in the fixing protrusion P. The adhesive 230 may be configured to bond the lower portion of each of the plurality of battery cells 100 and the inner surface of the fixing protrusion P to each other.

Therefore, according to this configuration of the present disclosure, since the fixing protrusion P is provided to the inner surface of the pack housing 210, the plurality of battery cells 100 may be easily placed at correct positions, and also the bonding area between the inner surface of the pack housing 210 and the plurality of battery cells 100 may be increased, thereby effectively increasing the bonding force.

Moreover, since the adhesive 230 may be accommodated in the fixing protrusion P, it is possible to fix the plurality of battery cells 100 using a small amount of adhesive 230 without waste. Accordingly, it is possible to reduce the manufacturing cost of the battery pack 200.

Figure 5:
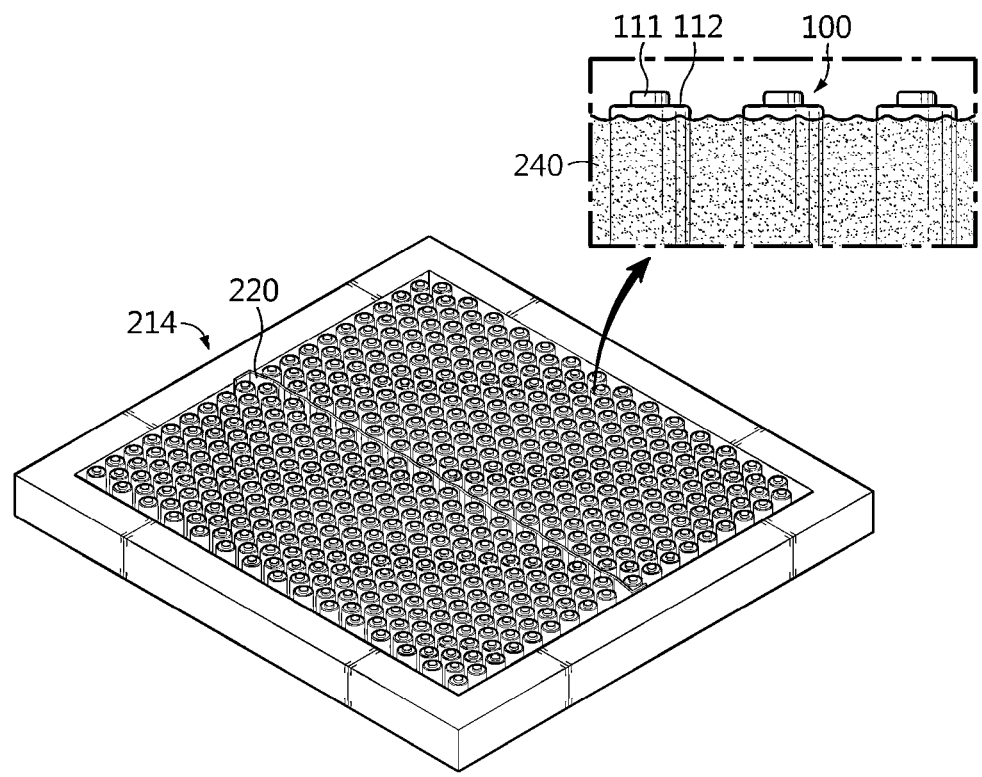
FIG. 5 is a perspective view schematically showing some components of a battery pack according to another embodiment of the present disclosure.

FIG. 5 is a perspective view schematically showing some components of a battery pack according to another embodiment of the present disclosure.

Referring to FIG. 5 along with FIG. 2, the pack housing 210 of the battery pack 200 according to the present disclosure may further include a filler 240 added therein. The filler 240 may be filled inside the pack housing 210 not to cover the electrode terminal located at the upper portion of the battery cell 100. That is, the filler 240 may be filled inside the pack housing 210 to surround a horizontal side portion of the battery cell 100.

In addition, the filler 240 may be a polymer resin configured to be cured after being added into the pack housing 210. For example, the filler 240 may be an epoxy resin.

Therefore, according to this configuration of the present disclosure, since the filler 240 is added into the pack housing 210 to surround the side portion of each of the plurality of battery cells 100, it is possible to prevent an electrical short circuit between the plurality of battery cells 100. Moreover, if a rupture or flame occurs at the side portion of the battery can since any one of the plurality of battery cells 100 is ignited in use of the battery pack 200 due to an external shock or abnormal operation, it is possible to prevent flame or high-temperature gas from being transmitted to the plurality of battery cells 100 adjacent to the ignited battery cell 100 to cause thermal runaway or chain ignition. That is, the filler 240 may play a role of blocking heat transfer between the plurality of battery cells 100.

Meanwhile, referring again to FIGS. 1 and 2, the pack housing 210 of the present disclosure may include a lower frame 214 and an upper frame 212. Specifically, the lower frame 214 may include a lower wall 214c to which the plurality of battery cells 100 are fixed, and a sidewall 214d extending upward from an outer periphery of the lower wall 214c, so that an accommodation space for accommodating the plurality of battery cells 100 is formed therein. The height of the sidewall 214d corresponds to the height of the battery cells 100.

The plurality of battery cells 100 are fixed to the inner bottom surface 214a of the lower frame 214, namely to the upper surface of the lower wall 214c. The filler 240 is put into the lower frame 214 so that the filler 240 is interposed between the plurality of battery cells 100 fixed on the lower frame 214. The filler 240 is provided not to cover the positive electrode terminal 111 and the negative electrode terminal 112 provided at the upper end of the battery cell 110.

In addition, the upper frame 212 is coupled onto the lower frame 214 filled with the filler 240. That is, the upper frame 212 may be coupled to the upper end of the sidewall 214*d* of the lower frame 214. The upper frame 212 may be located at the upper portion of the plurality of battery cells 100.

Figure 6:
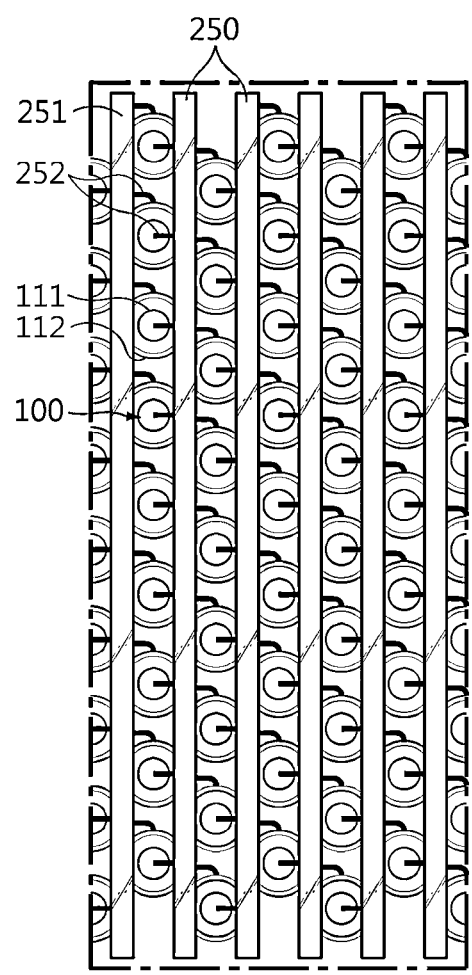
FIG. 6 is a partial plan view schematically showing some components of the battery pack according to an embodiment of the present disclosure.

FIG. 6 is a partial plan view schematically showing some components of the battery pack according to an embodiment of the present disclosure. In FIG. 6, only a bus bar 250 and the plurality of battery cells 100 are depicted in order to show the electrical connection between the bus bar 250 and the plurality of battery cells 100, and the other components are not shown.

Referring to FIG. 6 along with FIG. 2, the battery pack 200 of the present disclosure may further include a plurality of bus bars 250. The bus bar 250 may be configured to establish an electrical connection between the plurality of battery cells 100. The bus bar 250 may have a conductive metal. The bus bar 250 may include, for example, at least one of copper, nickel, and aluminum.

In addition, the plurality of bus bars 250 may be mounted on the upper frame 212. The bus bar 250 may be configured to contact the electrode terminals of each of the plurality of battery cells 100. For example, the bus bar 250 may include a body plate 251 elongated along the plurality of battery cells 100 and a plurality of conductive wires 252.

Moreover, the upper frame 212 may include an exposed portion T2 perforated to expose the upper portion of the plurality of battery cells 100 to the outside.

In addition, the body plate 251 and the conductive wire 252 may be connected to each other. The conductive wire 252 may contact the positive electrode terminal 111 or the negative electrode terminal 112 formed at the upper portion of the plurality of battery cells 100 through the exposed portion T2 of the upper frame 212. The bus bar 250 may electrically connect the plurality of battery cells 100 in series and/or in parallel.

In the battery cell 100 of the present disclosure, a pair of electrode terminals 111, 112 are provided in the same direction. This structure may simplify the electric connection. In addition, this structure may allow that a surface of the battery cell 100 opposite to the electrode terminals 111, 112 is directly coupled onto the cooling frame 260. As described above, both of the positive electrode terminal 111 and the negative electrode terminal 112 of the battery cell 100 applied in the present disclosure are provided at one side of the battery cell 100. For example, if the battery cell 100 is a cylindrical battery cell, a peripheral region of the upper end of the battery can 116 functions as the negative electrode terminal 112, and the battery cap covering the top opening of the battery can 116 functions as the positive electrode terminal 111. The peripheral region of the upper end of the battery can 116 may mean an upper surface of a crimping portion that is formed to fix the battery cap covering the top opening of the battery can 116 and functioning as the positive electrode terminal 111

Therefore, according to this configuration of the present disclosure, since the bus bar 250 includes a plurality of conductive wires 252, the bus bar 250 may accurately contact the electrode terminals 111, 112 provided at the upper portion of the plurality of battery cells 100. That is, the bus bar 250 needs to be configured not to cause an electrical short between the plurality of battery cells 100. However, if the distance between the positive electrode terminal 111 and the negative electrode terminal 112 of the plurality of battery cells 100 is very short, a precise connection work is required between the bus bar 250 and the electrode terminal. Accordingly, in the present disclosure, the bus bar 250 and the electrode terminals may be precisely connected through the conduction wire, thereby reducing the risk of explosion or ignition caused by an electrical short.

Moreover, the battery pack of the present disclosure may further include an upper cover 216 as shown in FIGS. 1 and 2. The upper cover 216 may prevent other conductors from contacting the bus bar 250 by covering the upper portion of the plurality of bus bars 250. The upper cover 216 may have a plate shape extending in a horizontal direction.

Figure 7:
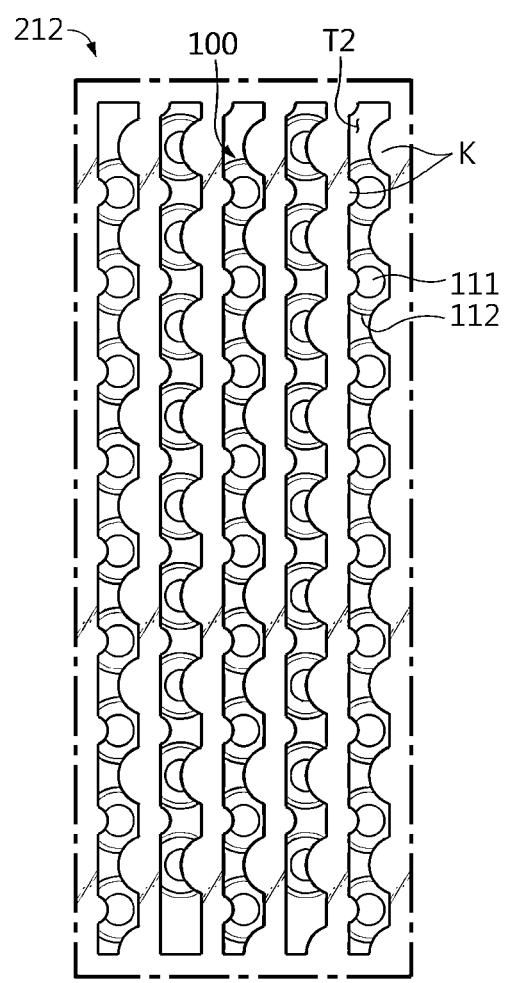
FIG. 7 is a partial plan view schematically showing some components of the battery pack according to an embodiment of the present disclosure.

FIG. 7 is a partial plan view schematically showing some components of the battery pack according to an embodiment of the present disclosure.

Referring to FIG. 7 along with FIGS. 2 and 6, the upper frame 212 of the pack housing 210 of the present disclosure may include a protruding portion K configured to cover a portion of the electrode terminal of each of the plurality of battery cells 100. That is, the protruding portion K may protrude to cover a portion of the positive electrode terminal 111 and/or the negative electrode terminal 112. The protruding portion K may have a shape protruding toward the electrode terminal inside the exposed portion T2.

For example, as shown in FIG. 7, one of the plurality of protruding portions K may have a shape protruding so that a portion of the negative electrode terminal 112 provided at the upper portion of the battery cell 100 is not exposed upward. In addition, another of the plurality of protruding portions K may have a shape protruding so that a portion of the negative electrode terminal 112 provided at the upper portion of the battery cell 100 is not exposed upward.

For example, among the plurality of conductive wires 252 of the bus bar 250, the protruding portion K protruding to cover a portion of the negative electrode terminal 112 may be provided to a portion of the upper frame 212 adjacent to the conductive wire 252, which requires contact with the positive electrode terminal 111, in order to reduce the possibility that the conductive wire 252 contacts the negative electrode terminal 112.

Conversely, among the plurality of conductive wires 252 of the bus bar 250, the protruding portion K protruding to cover a portion of the positive electrode terminal 111 may be provided to another portion of the upper frame 212 adjacent to the conductive wire 252, which requires contact with the negative electrode terminal 112, in order to reduce the possibility that the conductive wire 252 contacts the positive electrode terminal 111.

Therefore, according to this configuration of the present disclosure, since the upper frame 212 includes the protruding portion K protruding toward the electrode terminal so as to cover a portion of the electrode terminal of each of the plurality of battery cells 100, during the work for connecting the bus bar 250 and the electrode terminal, it is possible to effectively reduce the risk of an electric short between the plurality of battery cells 100. Accordingly, it is possible to increase the manufacturing efficiency of the battery pack 200 and effectively reduce the occurrence of accidents during the manufacturing process.

Figure 8:
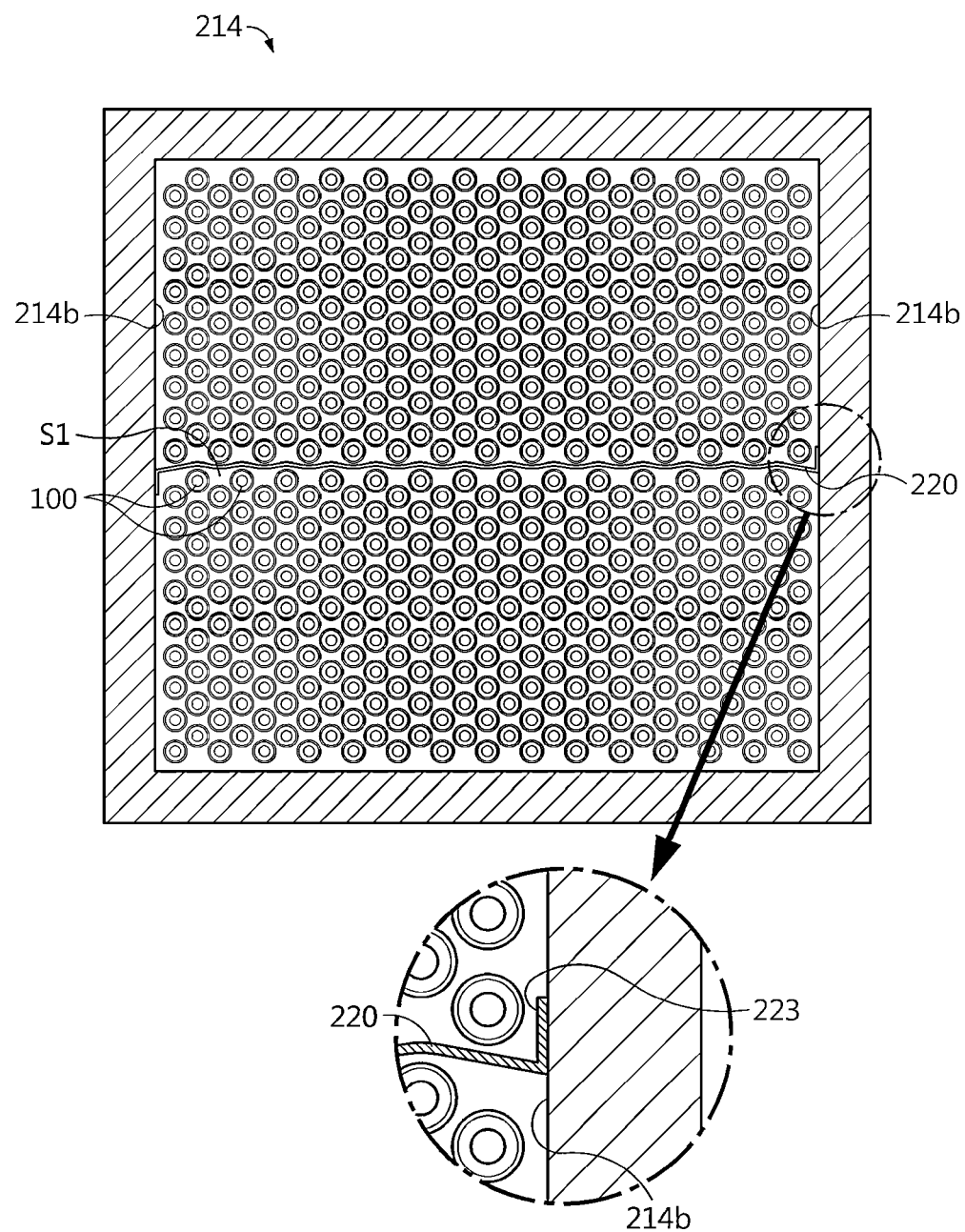
FIG. 8 is a plan view schematically showing some components of a battery pack according to another embodiment of the present disclosure.

FIG. 8 is a plan view schematically showing some components of a battery pack according to another embodiment of the present disclosure.

Referring back to FIG. 8 along with FIG. 2, the battery pack 200 of the present disclosure may further include a reinforcing member 220. Specifically, the reinforcing member 220 may be located inside the pack housing 210. The reinforcing member 220 may be fixed to an inner surface of the pack housing 210. Here, the reinforcing member 220 may be fixed to the pack housing 210 in various ways, for example by welding or bonding. The reinforcing member 220 may be a metal with excellent mechanical rigidity. For example, the reinforcing member 220 may be stainless steel, steel, or aluminum alloy.

In particular, the reinforcing member 220 may be fixed to at least one of an inner lower surface, an inner upper surface and an inner side surface of the pack housing 210. For example, the reinforcing member 220 may have a shape extending to traverse the inside of the pack housing 210 in a left and right direction. An upper portion of the reinforcing member 220 may be fixed to the inner upper surface, and a lower portion of the reinforcing member 220 may be fixed to the inner lower surface.

In addition, the reinforcing member 220 may have a bending pattern B1. That is, the bending pattern B1 may be alternately bent in a front and rear direction. Thus, the bending pattern B1 may increase the mechanical rigidity of the reinforcing member 220.

Therefore, according to this configuration of the present disclosure, since the present disclosure further includes the reinforcing member 220 fixed to at least one of the inner lower surface, the inner upper surface and the inner side surface of the pack housing 210, it is possible to effectively prevent the pack housing 210 from being deformed due to vibration or external shock. That is, the reinforcing member 220 may prevent the pack housing 210 from being deformed by the weight of the plurality of battery cells 100. In particular, the reinforcing member 220 may effectively prevent the pack housing 210 from being bent in an upper and lower direction.

Accordingly, it is possible to reduce damage of the pack housing 210 caused by frequent deformation, and it is possible to prevent the plurality of battery cells 100 or internal components mounted inside the pack housing from being damaged due to vibration or external shock.

Moreover, in the present disclosure, a central portion of the pack housing 210 is not mechanically vulnerable, so it is easy to implement a large-capacity battery pack 200 equipped with a large number of secondary batteries. Accordingly, it is possible to increase the energy density of the battery pack 200 and reduce the manufacturing cost by reducing the number of components.

In addition, referring to FIG. 8 again along with FIG. 2, the reinforcing member 220 may include a body portion 221 extending in one direction and a bent portion 223 provided at each of both ends of the body portion 221. The bent portion 223 may be bent to face the inner side surface of the pack housing 210. For example, as shown in FIG. 8, the bent portion 223 provided at a left end of the body portion 221 of the reinforcing member 220 may be bent to the front. The bent portion 223 provided at a right end of the body portion 221 may be bent to the rear. This reinforcing member 220 may suppress the deformation of the pack housing 210.

In addition, as shown in FIGS. 5 and 8, the bent portion 223 of the reinforcing member 220 may be bonded to the inner side surface of the pack housing 210 by the filler 240. Accordingly, the outer surface of the bent portion 223 and the inner side surface 214b of the pack housing 210 may be bonded to each other.

Therefore, according to this configuration of the present disclosure, since the reinforcing member 220 includes a body portion 221 and a bent portion 223 provided at each of both ends of the body portion 221 so as to be bent to face the inner side surface of the pack housing 210 and to be bonded to the inner side surface of the pack housing 210 by the filler 240, it is possible to effectively increase the contact area between the reinforcing member 220 and the inner side surface 214b of the pack housing 210. Accordingly, it is possible to effectively increase the fixing force of the reinforcing member 220. Therefore, in the present disclosure, by using a larger fixing force, it is possible to prevent the pack housing 210 from being deformed due to an external impact.

Figure 9:
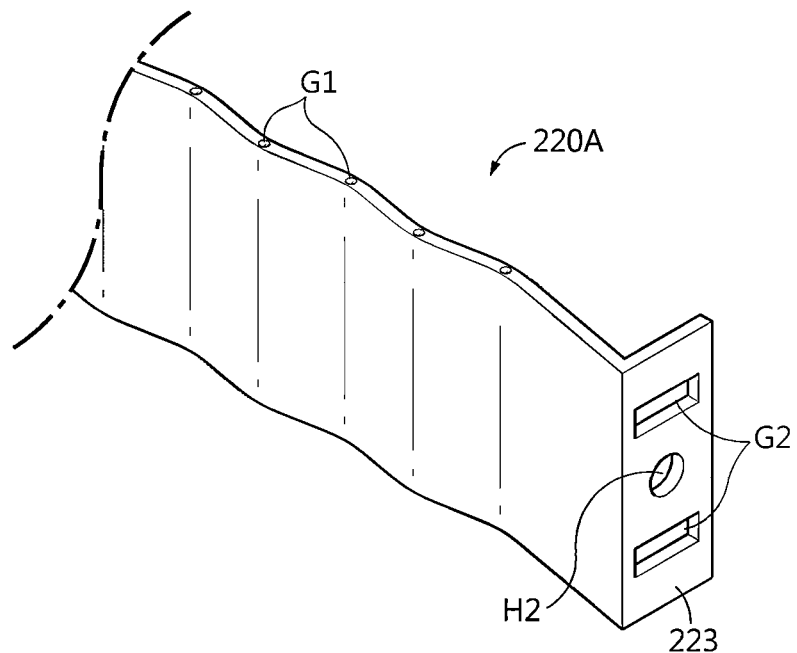
FIG. 9 is a partial perspective view schematically showing a reinforcing member of the battery pack according to another embodiment of the present disclosure.

FIG. 9 is a partial perspective view schematically showing a reinforcing member of the battery pack according to another embodiment of the present disclosure.

Referring to FIG. 9, a reinforcing member 220A of the battery pack 200 according to another embodiment may have an accommodation groove G1 and a coupling hole G2. Specifically, the accommodation groove G1 may be formed by indenting a part of the body portion 221 inward so that the filler 240 is filled therein. For example, a plurality of accommodation grooves G1 may be formed to be spaced apart from each other at predetermined intervals on each of the upper and lower portions of the body portion 221.

In addition, the coupling hole G2 may be formed at an outer surface of the bent portion 223. The coupling hole G2 may be formed by perforating a part of the bent portion 223 so that the filler 240 is partially accommodated therein. For example, as shown in FIG. 9, two coupling holes G2 may be formed in the outer surface of the bent portion 223.

Therefore, according to this configuration of the present disclosure, since the reinforcing member 220A includes an accommodation groove G1 formed by indenting a part of the body portion 221 inward so that the filler 240 is filled therein and a coupling hole G2 formed by perforating a part of the bent portion 223 so that the filler 240 is accommodated therein, an appropriate amount of filler 240 may be accommodated in the accommodation groove G1 and the coupling hole G2 of the reinforcing member 220A, thereby increasing the bonding power thereof to the inner upper surface and the inner side surface of the pack housing 210. Accordingly, it is possible to effectively increase the durability of the battery pack 200.

Moreover, the bent portion 223 may have a coupling hole H2 that may be coupled to the sidewall 214d of the pack housing by bolting. A bolt hole (not shown) that communicates with the coupling hole H2 may be formed in the sidewall 214d of the pack housing.

Figure 10:
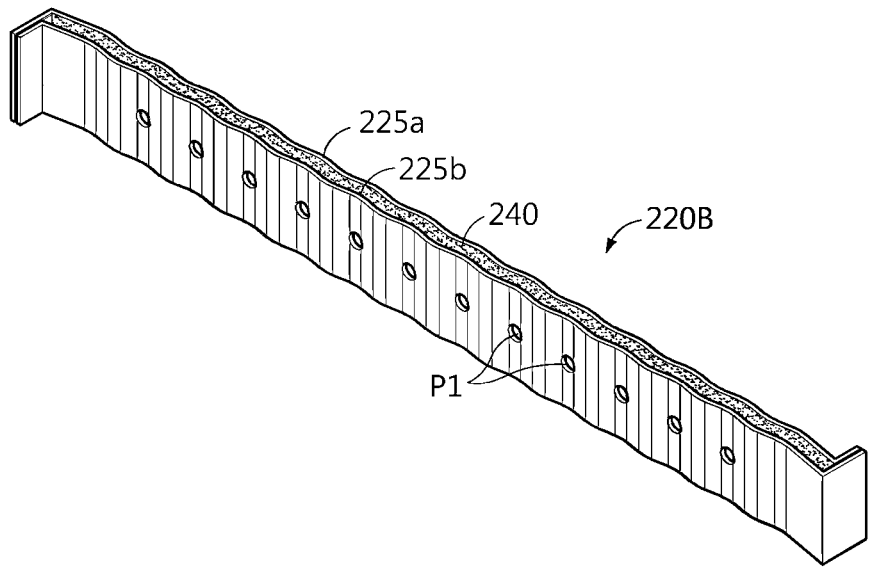
FIG. 10 is a perspective view schematically showing a reinforcing member of a battery pack according to still another embodiment of the present disclosure.

FIG. 10 is a perspective view schematically showing a reinforcing member of a battery pack according to still another embodiment of the present disclosure.

Referring to FIG. 10, a reinforcing member 220B of the battery pack 200 according to another embodiment may include a pair of plates 225a, 225b extending in one direction and spaced apart from each other by a predetermined distance to form an inner space. The filler 240 may be filled between the pair of plates 225a, 225b. For example, as shown in FIG. 10, the reinforcing member 220B may include a pair of plates 225a, 225b extending in a left and right direction. The pair of plates 225a, 225b are separated from each other by a predetermined interval, and the space S1 may be filled with the filler 240.

Therefore, according to this configuration of the present disclosure, since the reinforcing member 220B includes a pair of plates 225a, 225b, a sufficient amount of filler 240 may be filled between the pair of plates 225a, 225b, thereby further increasing the rigidity of the reinforcing member 220B. In addition, the bonding force to each of the lower surface and the upper surface of the pack housing 210 may be further increased by the reinforcing member 220B containing a sufficient amount of filler 240 therein.

In addition, in each of the pair of plates 225a, 225b, an opening P1 may be formed so that the inner space between the pair of plates 225a, 225b communicates with the outside. The opening P1 may be formed to fill the separated space of the plurality of battery cells 100 with the filler 240. That is, the openings P1 may be formed at positions corresponding to the separated space of the plurality of battery cells 100 in the front and rear direction. Accordingly, a part of the filler 240 filled between the pair of plates 225a, 225b may flow out through the opening P1 into the separated space of the plurality of battery cells 100.

Therefore, according to this configuration of the present disclosure, since the reinforcing member 220 includes a pair of plates 225a, 225b and the filler 240 is filled between the pair of plates, an appropriate amount of filler 240 may be injected into the reinforcing member 220B, thereby effectively increasing the bonding force between the reinforcing member 220B and the inner surface of the pack housing 210. Ultimately, the reinforcing member 220B may be coupled to the inner surface of the pack housing 210 with a higher fixing force, thereby effectively increasing the durability of the battery pack.

Meanwhile, the battery pack 200 according to an embodiment of the present disclosure may further include various devices (not shown) for controlling the charging and discharging of the battery pack 200, for example, a BMS (Management System Module), a current sensor, a fuse, and the like.

Meanwhile, an electronic device (not shown) according to an embodiment of the present disclosure includes at least one battery pack 200 described above. The electronic device may further include a device housing (not shown) having an accommodation space for accommodating the battery pack 200, and a display unit through which the user may check the state of charge of the battery pack 200.

In addition, the battery pack 200 according to an embodiment of the present disclosure may be included in a vehicle such as an electric vehicle or a hybrid electric vehicle. That is, the vehicle according to an embodiment of the present disclosure as described above may include the battery pack 200 including at least one battery pack 200 in a vehicle body.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 200: battery pack | |
| 100: battery cell | |
| 210: pack housing | |
| 212, 214, 216: upper frame, lower frame, upper cover | |
| 220: reinforcing member | 221, 223: body portion, bent portion |
| 230: adhesive | 240: filler |
| 250, 252: bus bar, conductive wire | |
| K: protruding portion | |
| B1: bending pattern | |
| G1, G2: accommodation groove, coupling hole | |
| S1: space | |
| 225a, 225b: plates | P1, T2: opening, exposed portion |

What is claimed is:

1. A battery pack, comprising:
    a plurality of battery cells elongated to be oriented in a vertical direction and having a pair of electrode terminals located at an upper portion thereof, the plurality of battery cells being arranged in at least one horizontal direction;
    a pack housing having an accommodation space in which the plurality of battery cells are accommodated and configured such that a lower portion of each of the plurality of battery cells is bonded to an inner surface of the pack housing; and
    a reinforcing member fixed to at least one of an inner lower surface, an inner upper surface, and an inner side surface of the pack housing,
    wherein the reinforcing member includes:
    a body portion configured to extend toward the inner side surface, and
    a bent portion at each of both ends of the body portion and configured to be bent to face the inner side surface of the pack housing and to be bonded to the inner side surface of the pack housing.

2. The battery pack according to claim 1, wherein the pack housing includes a plurality of fixing protrusions configured to accommodate an adhesive so that the lower portion of each of the plurality of battery cells is inserted in the fixing protrusions.

3. The battery pack according to claim 1, wherein a filler is added inside the pack housing to surround a side portion of each of the plurality of battery cells.

4. The battery pack according to claim 3, wherein the pack housing includes a lower frame configured to accommodate the plurality of battery cells therein and an upper frame coupled to the lower frame and disposed at an upper portion of the plurality of battery cells,
    wherein the battery pack further comprises a plurality of bus bars mounted on the upper frame and configured to contact the electrode terminals of each of the plurality of battery cells, and
    wherein the bus bar includes a plurality of conductive wires.

5. The battery pack according to claim 4, wherein the upper frame includes a protruding portion protruding toward at least one of the pair of electrode terminals of each of the plurality of battery cells to cover at least one of the pair of electrode terminals of each of the plurality of battery cells.

6. The battery pack according to claim 3, wherein the reinforcing member includes:
    an accommodation groove inwardly disposed at a part of the body portion so that the filler is filled therein; and
    a coupling hole at a part of the bent portion so that the filler is accommodated therein.

7. The battery pack according to claim 3, wherein the reinforcing member includes a pair of plates respectively configured to extend in one direction and spaced apart from each other by a predetermined distance to define a space therebetween, wherein each of the pair of plates has an opening such that an inner space between the pair of plates communicates with an outside of the battery pack, and wherein the inner space between the pair of plates is filled with the filler.

8. An electronic device, comprising at least one battery pack according claim 1.

9. A vehicle, comprising at least one battery pack according to claim 1.

* * * * *